Aug. 7, 1928.
J. H. WAGENHORST
AUTOMOBILE WHEEL
1,679,455
Original Filed Aug. 9, 1920   2 Sheets-Sheet 1
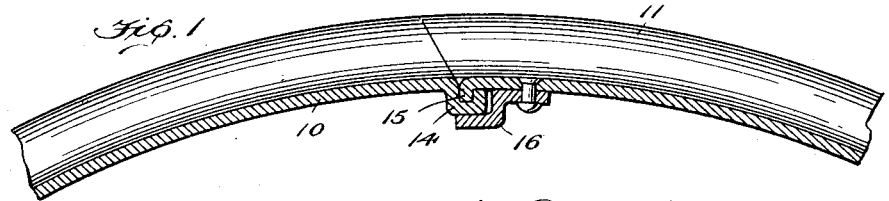
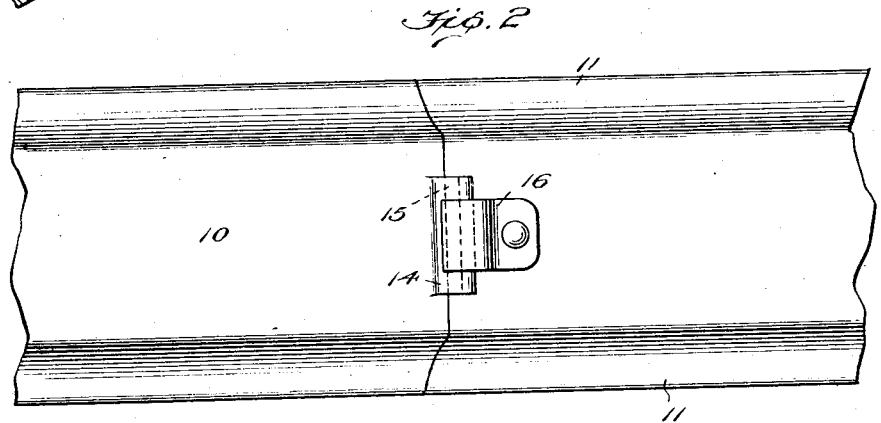
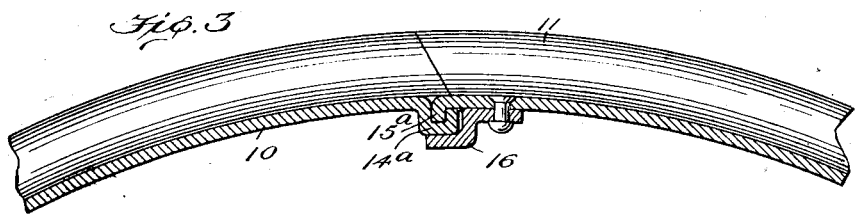
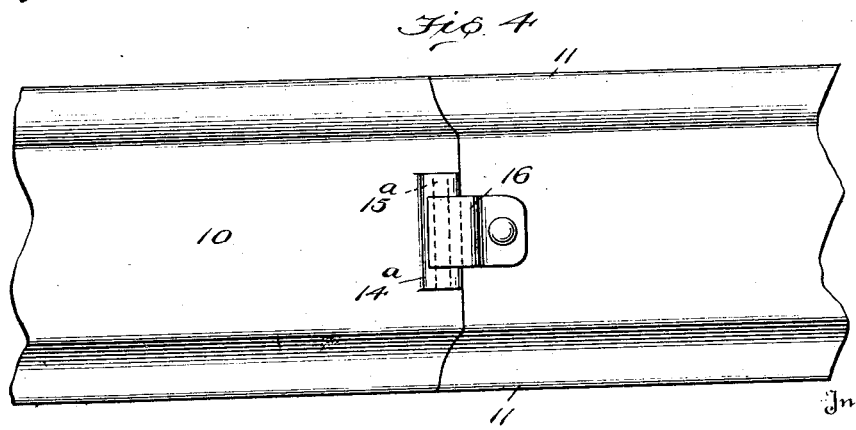
Inventor
James H. Wagenhorst
By
His Attorneys Aug. 7, 1928. 1,679,455
J. H. WAGENHORST
AUTOMOBILE WHEEL
Original Filed Aug. 9, 1920    2 Sheets-Sheet 2
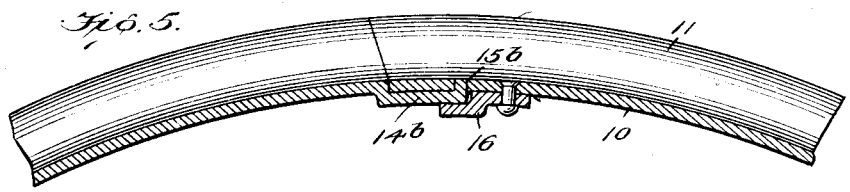
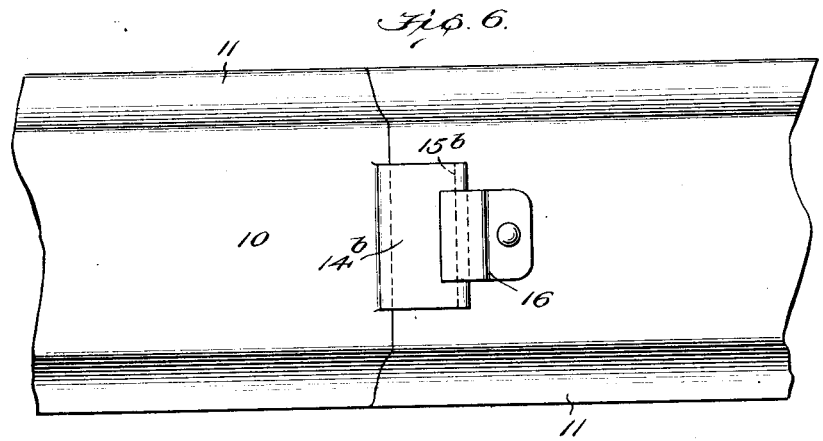
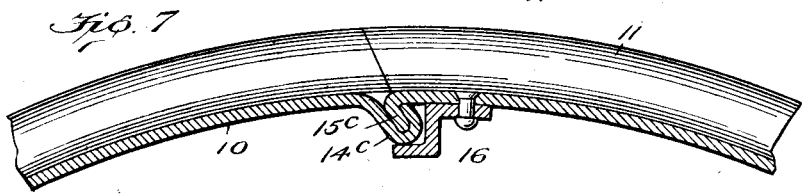
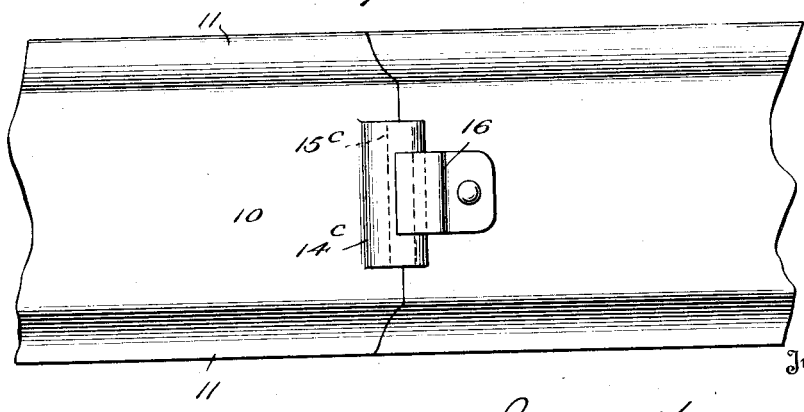
Inventor
James H. Wagenhorst
By
his Attorneys Patented Aug. 7, 1928.

1,679,455

UNITED STATES PATENT OFFICE.

JAMES H. WAGENHORST, OF JACKSON, MICHIGAN.

AUTOMOBILE WHEEL.

Original application filed August 9, 1920, Serial No. 402,105. Divided and this application filed December 3, 1925. Serial No. 72,918.

This invention relates to improvements in automobile wheels and particularly to wheels having split demountable rims for carrying the tire.

One object of the invention is to provide a simple but effective construction for connecting the ends of a rim of the transplit type to hold the ends against radial displacement as well as against circumferential separation. A further object is to form such connecting means for the ends of the rim substantially integral with the rim ends. In this way, there are no detachable parts which may be lost or which must be manufactured separately and then attached to the rim. By forming such connecting means integrally with the rim they are always kept intact while, at the same time, the cost of the production of the rim is not materially increased.

This application is a division of applicant's co-pending application Serial No. 402,105, filed August 9, 1920.

With these and other objects in view, the invention consists in certain novel details of construction and combinations and arrangements of parts all as will be hereinafter more fully described and the novel features thereof particularly pointed out in the appended claims.

In the drawings,—

Figure 1 is a sectional view taken circumferentially of the rim illustrating one form which the cooperating locking elements may take.

Fig. 2 is a plan view of the inner face of the rim shown in Fig. 1.

Fig. 3 is a sectional view showing a slightly modified form of connecting elements.

Fig. 4 is a view similar to Fig. 2 illustrating the inner face of the rim shown in Fig. 3.

Fig. 5 is a view similar to Fig. 1 illustrating another modified form of rim end locking members.

Fig. 6 is a view similar to Figs. 2 and 4 illustrating the rim shown in Fig. 5.

Fig. 7 is a view similar to Fig. 1 showing a still further modification of the rim end locking elements.

Fig. 8 is a view similar to Figs. 2, 4 and 6 illustrating the entire face of the rim shown in Fig. 7.

As usual, the rim is adapted to carry a tire, as is well understood and comprises a base portion 10 and outwardly directed tire retaining flanges 11 at the edges of said base portion. To facilitate mounting the tire on the rim, or for removing the tire therefrom, said rim is split transversely as is well known in the art.

As before generally outlined, the rim ends are preferably locked together against circumferential and radial separation by means formed integrally therewith, each of the rim ends having formed thereon a locking element, the two elements on the two rim ends being adapted to interlock with each other in such wise as to prevent such circumferential or radial separation. If desired, these interlocking elements may be in the form of inwardly directed members formed on the inner face of the rim adjacent the split in the latter but, as will become apparent from an examination of the accompanying drawings and from the ensuing description, one of these inwardly directed elements may be dispensed with and one end of the rim provided with an orifice with which the member on the other end of the rim may interlock.

The preferred arrangement for locking these ends together, is illustrated in Figs. 1 and 2 wherein one end of the rim is formed with a protruding inwardly extending hook shaped member 14, into which is received projection 15 extending inwardly from the inner face of the rim at a point substantially in line with the split in the rim. With this projection 15 and the hook shaped member 14 interlocked, as shown in the drawings, the rim ends are positively held against circumferential separation, these interlocking elements being held in their cooperating locked positions in any suitable way as by a button 16 pivoted to the rim end on which projection 15 is formed and adapted to engage the inner face of the hook shaped member 14. As will be readily appreciated, these interlocking elements may readily be formed integrally with the rim ends without materially increasing the cost of production of the rim and, while such locking members are quite simple in their construction, nevertheless, they are quite effective so far as preventing radial and circumferential separation of the rim ends is concerned.

In Figs. 3 and 4 the hook shaped extension 14$^a$ does not protrude beyond the end of the rim on which it is formed but, on the contrary, extends substantially to the end face of that rim end. On the other hand, the inwardly directed projection 15ª which cooperates with said hook shaped extension projects beyond the end of the rim on which it is formed. These parts, in this modification, function in the same way as in the previous construction and are held in their interlocking position by the button 16 as in the construction first described.

In the modified construction of Figs. 5 and 6, the interlocking elements for securing together the rim ends are likewise formed integrally with the rim but, in this instance, the hook shaped member 14ᵇ instead of engaging with an inwardly directed extension engages in an orifice 15ᵇ, the end portion of the rim proper being received in the recess of the hook shaped member. Here, again, the locking elements are retained in their interlocked positions by the button 16.

In the embodiment of the invention illustrated in Figs. 7 and 8 the interlocking elements are formed very much the same as in the construction shown in Figs. 1 and 2, the hook shaped member 14ᶜ extending beyond the end of the rim on which it is formed and the inwardly directed extension 15ᶜ lying substantially in the plane of the split in the rim. In this form of the invention, however, the locking elements are not disposed radially of the rim but project inwardly at an oblique angle. As in the other forms of the invention, these interlocking elements are maintained in interlocking relation by the pivoted button 16.

In considering these rim end connecting devices, it should be remembered that their principal function is to hold the ends of the rim from radial and circumferential separation when the rim, carrying an inflated tire, is removed from the wheel, as, for instance, when it is carried as a spare. When the rim, carrying a tire, is mounted on a wheel, the felly of the wheel, the rim securing means and the tire together tend to prevent radial and circumferential separation of the rim ends and thus take some of the strain from the rim end connecting devices.

What I claim is:

1. A transplit tire carrying rim divided at one point only, the ends thereof being bent to have interlocking engagement to prevent radial displacement, said interlocking portions of the rim being shaped for engagement with each other to prevent circumferential separation.

2. A tire carrying rim divided at one point only, one end having an integral extension which is bent inwardly, the opposite end having an integral extension which is bent first inwardly and then outwardly, said extensions being adapted to interlock with each other.

3. A tire carrying rim divided at one point only, the ends of said rim being provided with integral extensions bent to form interlocking hooks, and a button pivoted to one of the rim ends and adapted to engage the hooked extensions of the opposite rim end.

4. A tire carrying rim divided at one point only, one end having an integral extension bent inwardly at one side of the split in the rim, the opposite end having an integral extension which is first bent inwardly and then outwardly, the reversely-turned extension projecting beyond the split and overlying the first mentioned rim end and inturned extension thereon to hold the two ends against circumferential and radial separation.

JAMES H. WAGENHORST.